United States Patent
Younce et al.

(10) Patent No.: US 10,944,482 B2
(45) Date of Patent: Mar. 9, 2021

(54) COHERENT OPTICAL RECEIVER

(71) Applicant: Elenion Technologies, LLC, New York, NY (US)

(72) Inventors: Richard C. Younce, Naperville, IL (US); Alexander Rylyakov, Staten Island, NY (US); Michael J. Hochberg, New York, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 16/424,580

(22) Filed: May 29, 2019

(65) Prior Publication Data

US 2020/0382217 A1     Dec. 3, 2020

(51) Int. Cl.
| | |
|---|---|
| *H04B 10/61* | (2013.01) |
| *H04B 10/532* | (2013.01) |
| *G02B 6/293* | (2006.01) |
| *G02F 1/225* | (2006.01) |
| *H04B 10/67* | (2013.01) |
| *G02F 1/21* | (2006.01) |

(52) U.S. Cl.
CPC .......... *H04B 10/614* (2013.01); *G02B 6/2935* (2013.01); *G02B 6/29395* (2013.01); *G02F 1/225* (2013.01); *H04B 10/532* (2013.01); *H04B 10/612* (2013.01); *H04B 10/6161* (2013.01); *H04B 10/65* (2020.05); *H04B 10/676* (2013.01); *G02F 2001/212* (2013.01)

(58) Field of Classification Search
CPC .......... H04B 10/60–6973; H04J 14/616–6166
See application file for complete search history.

(56) References Cited

U.S. PATENT DOCUMENTS

| | | | |
|---|---|---|---|
| 6,961,492 B2 | 11/2005 | Doerr | |
| 8,401,405 B2 | 3/2013 | Barton et al. | |
| 8,406,635 B2 | 3/2013 | Nakashima et al. | |
| 8,472,814 B2 | 6/2013 | Zhang et al. | |
| 9,281,902 B2 | 3/2016 | Liboiron-Ladouceur et al. | |
| 9,418,723 B2 * | 8/2016 | Chishti | G11C 11/40611 |
| 9,419,723 B2 | 8/2016 | Takechi | |
| 9,590,731 B2 | 3/2017 | Roberts et al. | |
| 2002/0186435 A1 * | 12/2002 | Shpantzer | H04B 10/2563 398/99 |
| 2003/0058499 A1 * | 3/2003 | Reingand | H04B 10/5051 398/98 |
| 2010/0054761 A1 | 3/2010 | Chen et al. | |

(Continued)

OTHER PUBLICATIONS

Phase Diversity Techniques for Coherent Optical Receivers, A.W. Davis et al, Journal of Lightwave Technology, vol. LT-5, No. 4, Apr. 1987, pp. 561-571.

*Primary Examiner* — Nathan M Cors
(74) *Attorney, Agent, or Firm* — Stratford Managers Corporation

(57) ABSTRACT

A coherent optical receiver for AM optical signals has a photonic integrated circuit (PIC) as an optical front-end. The PIC includes a polarization beam splitter followed by two optical hybrids each followed by an opto-electric (OE) converter. Each OE converter includes one or more differential detectors and one or more squaring circuits, which outputs may be summed. The PIC may further include integrated polarization controllers, wavelength demultiplexers, and/or tunable dispersion compensators.

14 Claims, 12 Drawing Sheets

(56) References Cited

U.S. PATENT DOCUMENTS

| | | | | |
|---|---|---|---|---|
| 2011/0236025 A1* | 9/2011 | Wagner | ............... | H04B 10/65 |
| | | | | 398/115 |
| 2018/0278337 A1* | 9/2018 | Jensen | ............... | H04B 10/54 |
| 2019/0391348 A1* | 12/2019 | Osenbach | ............ | H04B 10/40 |
| 2020/0132931 A1* | 4/2020 | Fard | ............... | G02B 6/1223 |

* cited by examiner

COHERENT OPTICAL RECEIVER

TECHNICAL FIELD

The invention generally relates to coherent optical receivers, and more particularly relates to coherent optical receivers for amplitude modulated (AM) optical signals.

BACKGROUND

Direct detect communication techniques provide relatively simple and low-power solutions to optical transmission over short distances. For longer distances, direct-detection communication systems suffer from increased noise at the receiver due to a high optical fiber loss, which may result in an unacceptable Bit Error Rate (BER). Optical amplifiers can be used to boost optical signal power at the receiver and to provide increased receiver sensitivity, which however increases the cost and complexity of the communication link.

Coherent optical receivers include a laser source acting as a local oscillator (LO), which boosts the received signal power through coherent mixing. The phase of the LO light relative to the received light signal is however typically unknown, and digital signal processing is conventionally used to perform phase recovery and extract transmitter signals from the detected electrical signals. This signal processing may be relatively complex and thus typically requires digital signal processors (DSPs) that are relatively power-consuming and expansive.

Accordingly, it may be understood that there may be significant problems and shortcomings associated with current solutions and technologies for reliably receiving high-bandwidth optical signals at relatively long distances.

SUMMARY OF THE INVENTION

An aspect of the disclosure provides a coherent optical receiver (COR) comprising a photonic integrated circuit (PIC), a first opto-electronic (OE) converter, and a second OE converter. The PIC may comprise: a first polarization beam splitter (PBS) comprising a first output port and a second output ports, the PBS configured to split received signal light, which may carry one or more amplitude modulation (AM) signals, between the first and second output ports in a polarization-dependent manner; a first optical hybrid (OH) comprising an input signal port optically coupled to the first output port of the first PBS; and, a second OH comprising an input signal port optically coupled to the second output port of the first PBS, each of the first and second OH further comprising a local oscillator (LO) port and at least two output ports. The first OE converter is coupled to the at least two output optical ports of the first OH and is configured to produce a first electrical power signal responsive to amplitude modulation of light received in the input signal port of the first OH. The second OE converter is coupled to the at least two output optical ports of the second OH and is configured to produce a second electrical power signal responsive to amplitude modulation of light received in the input signal port of the second OH. Each of the first and second OE converters may comprise at least one differential detector and at least one squaring circuit for squaring electrical signals produced by the at least one differential detector.

BRIEF DESCRIPTION OF THE DRAWINGS

Embodiments disclosed herein will be described in greater detail with reference to the accompanying drawings, which may be not to scale and in which like elements are indicated with like reference numerals, and wherein.

DETAILED DESCRIPTION

Figure 1:
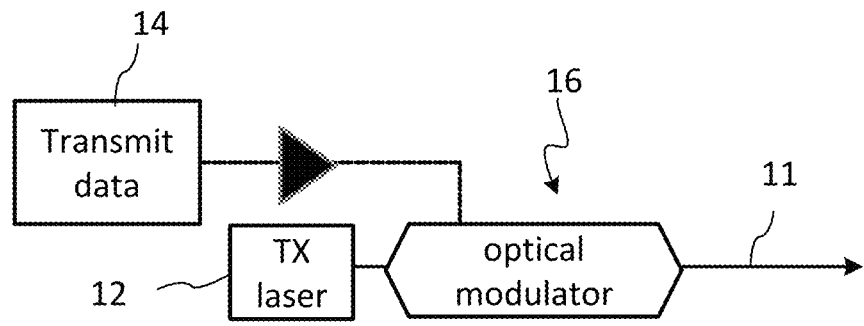
FIG. 1 is a schematic block diagram of a high-speed optical transmitter for transmitting AM signals in a single optical channel.

In the following description, for purposes of explanation and not limitation, specific details are set forth, such as particular optical circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:

GaAs Gallium Arsenide
InP Indium Phosphide
PIC Photonic Integrated Circuits
SOI Silicon on Insulator
ASK Amplitude Shift Keying
AM Amplitude Modulation
PAM Pulse Amplitude Modulation
BPSK Binary Phase Shift Keying
QAM Quadrature Amplitude Modulation
QPSK Quaternary Phase Shift Keying
DSP Digital Signal Processor
FPGA Field Programmable Gate Array
ASIC Application Specific Integrated Circuit
PC Polarization Controller
TDC Tunable Dispersion Compensator
MZM Mach-Zehnder Modulator
MZI Mach-Zehnder Interferometer In the following description, the term "light" refers to electromagnetic radiation with frequencies in the visible and non-visible portions of the electromagnetic spectrum. The term "optical" relates to electromagnetic radiation in the visible and non-visible portions of the electromagnetic spectrum. The terms "first", "second" and so forth are not intended to imply sequential ordering, but rather are intended to distinguish one element from another, unless explicitly stated. Similarly, sequential ordering of method steps does not imply a sequential order of their execution, unless explicitly stated. The term "coupled" encompasses both direct and indirect coupling, unless explicitly stated otherwise. Similarly the term "connected" encompasses both direct and indirect connections, unless explicitly stated otherwise.

The term "90° optical hybrid" refers to an optical device that has two input ports and four output ports and is configured to coherently combine two light inputs to produce four mixed output optical signals in which the two light inputs are added with an optical phase shift $\phi_{12}$ between them that increments by 90°, or $\pi/2$ radian, from one output of the optical hybrid (OH) to another, to result in port-to-port optical phase shifts of 90°, 180°, and 270°. The term "180° optical hybrid" refers to an optical hybrid configured to produce two mixed output optical signals in which two input optical signals are added with two optical phase shifts $\phi_{12}$ that differ by 180°. The term "wavelength" may be used to refer to light of one wavelength channel of a wavelength-multiplexed optical signal.

An aspect of the present disclosure relates to a coherent optical receiver (COR) for amplitude modulated (AM) optical signals, including high-bitrate AM optical signals. Embodiments of the coherent optical receivers (CORs) described herein may utilize polarization diversity reception or reception of polarization multiplexed signals, which may be implemented using an optical front-end in the form of a photonic integrated circuit (PIC). Among other elements, the PIC of the COR may include optical hybrids (OH), polarization beam splitters (PBS), polarization controllers (PC), and tunable dispersion compensators (TDC) in various combinations. The PIC implementing an optical receiver front-end may be fabricated in a single chip or in two or more chips, for example using planar waveguides.

FIG. 1 generally illustrates an example optical transmitter (TX) 10 that may be used to transmit AM optical signals at high data rates. It includes an optical source 12, a source of electrical modulation signal 14, which may also be referred to here as the data source, and an optical modulator 16. In some embodiments the optical source 12 may be a source of coherent optical radiation, such as a suitable laser, for example a single-frequency semiconductor laser, and may be referred to as the TX laser 12. The optical modulator 16 may be configured to modulate the intensity of light provided by the TX laser 12 at a desired data rate with the modulation signal produced by the data source 14, to produce AM signal light 11. In some embodiments the optical modulator 16 may be a suitably biased Mach-Zehnder (MZ) modulator (MZM), which may be configured to provide the desired amplitude modulation (AM) of the light from the TX laser 12, such as for example amplitude shift keying (ASK). For example, an MZM biased at a transmission quadrature point and driven by a variable voltage signal outputs a light signal that is modulated in amplitude or, equivalently, in intensity. The use of the optical modulator 16 that is external to the TX laser 12 enables to modulate the intensity of the laser light without changing its frequency, which is helpful for coherent detection.

Figure 2:
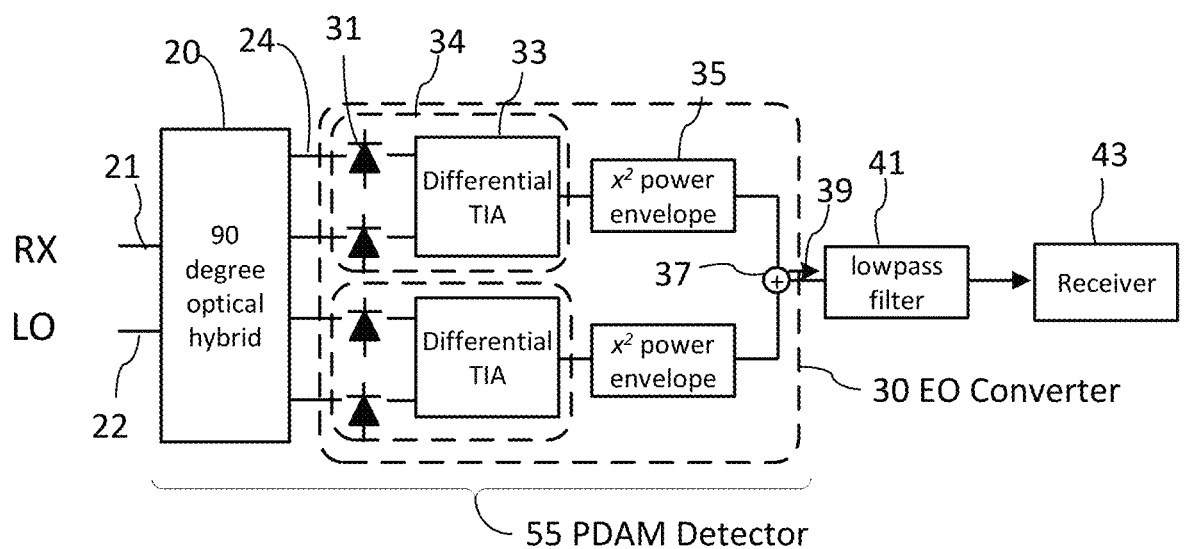
FIG. 2 is a schematic block diagram of a coherent optical receiver with phase diversity for receiving AM optical signals.

Referring to FIG. 2, there is schematically illustrated a coherent optical receiver (COR) 50 which may be used at a receiver end of a fiber-optic link to receive AM optical signals, such as the AM signal light 11 that may be generated by the optical transmitter 10. In the illustrated embodiment COR 50 includes an optical hybrid (OH) 20 that is followed by an opto-electric (OE) converter 30 and an electrical receiver circuit (ERC) 43. In some embodiment the OH 20 may be a 90° OH with two input ports and four output ports 24. The input ports of the OH 20 comprise a signal port 21 and a local oscillator (LO) port 22. In operation, signal light received from a fiber link is provided into the signal port 21, while light from an LO source, such as a suitable laser that may be present at the receiver, is guided into the LO port 22 of the OH 20 for mixing with the received signal light. The OE converter 30 is coupled at its input to the output ports 24 of the OH 20 and is configured to produce an electrical power signal $S_1(t)$ 39 that is responsive to the amplitude modulation of the signal light received by COR 50. An optical circuit formed by the OH 20 and the OE converter 30, which converts the received optical signal into the electrical power signal 39, may be referred to herein as the phase diversity amplitude modulation (PDAM) detector 55.

In some embodiments the OE converter 30 may include two differential detectors 34, two squaring circuits 35 for squaring electrical signals produced by the two differential detectors 34, and a summing circuit 37 for combining power signals produced by the two squaring circuits 35. Each of the two differential detectors 34 may be formed with two photodetectors (PD) 31 optically coupled to two output ports of the OH 20, and a differential amplifier 33 electrically connected to the two PDs. The PDs 31, differential amplifiers 33, the squaring circuits 35, and the summing circuit 37 may be sufficiently broad-band to operate at a data rate of the received AM signal. The PDs 31 in each of the two differential detectors 34 are coupled to a pair of counter-phase output ports 24 of the OH 20 for which the nominal phase shift $\phi_{12}$ between the LO light and the signal light differ by 180 deg, up to the phase accuracy of the OH 20.

In some embodiments the LO light received in the LO port 22 of the OH 20 may be of a substantially same optical frequency or wavelength that the AM signal light received in the signal port 21 of the OH 20, resulting in a homodyne phase-diversity detection. In such embodiments the mixing of the LO light and the received signal light produces mixed optical signals at the output ports of the OH 20 that are baseband intensity modulated, which lowers the analog bandwidth requirements of the receiver electronics. The electrical power signal 39 at the output of the OE converter 30, which includes the TX-defined AM signal in the baseband, may then be provided to the electrical receiver circuit 43 for further processing, such as for example re-timing, electrical de-multiplexing, and the like. The first electrical power signal 39 may be passed through a low-pass filter 41 to remove undesired high-frequency components and to clean-up its spectrum.

In some embodiments the LO light received in the LO port 22 of the OH 20 may be of a somewhat different optical frequency than the AM optical signal received in the signal port 21 of the OH 20, resulting in a heterodyne detection wherein the spectrum of the transmitted AM signal in the outputs of the differential detectors 34 is centered at an intermediate frequency (IF). The general signal detection scheme illustrated in FIG. 2 may remain substantially the same, with the exception of the low-pass filter 41 which may be changed to a band-pass filter. The heterodyne detection may however impose higher requirements on the bandwidth of the receiver components, from PDs 31 and downstream in the receiver circuit. Example embodiments described hereinbelow may be described with reference to a baseband receiver in which the LO light and the received AM optical signal are of substantially same optical frequency, however optical heterodyne-type reception and bandpass AM receivers are also within the scope of the present disclosure.

The optical phase difference between the signal light and the LO light is generally unknown and may vary during COR operation; possible signal fading resulting from this may be obviated using the phase diversity detection with two differential detectors and two squaring circuits. Although the output of each differential detector 34 may vary in time due to changes in the LO-signal phase shift, their combined electrical power signal 39 doesn't depend on the LO phase and remains unaffected by these changes, so an LO phase tuning or optical phase recovery is not required.

Figure 3:
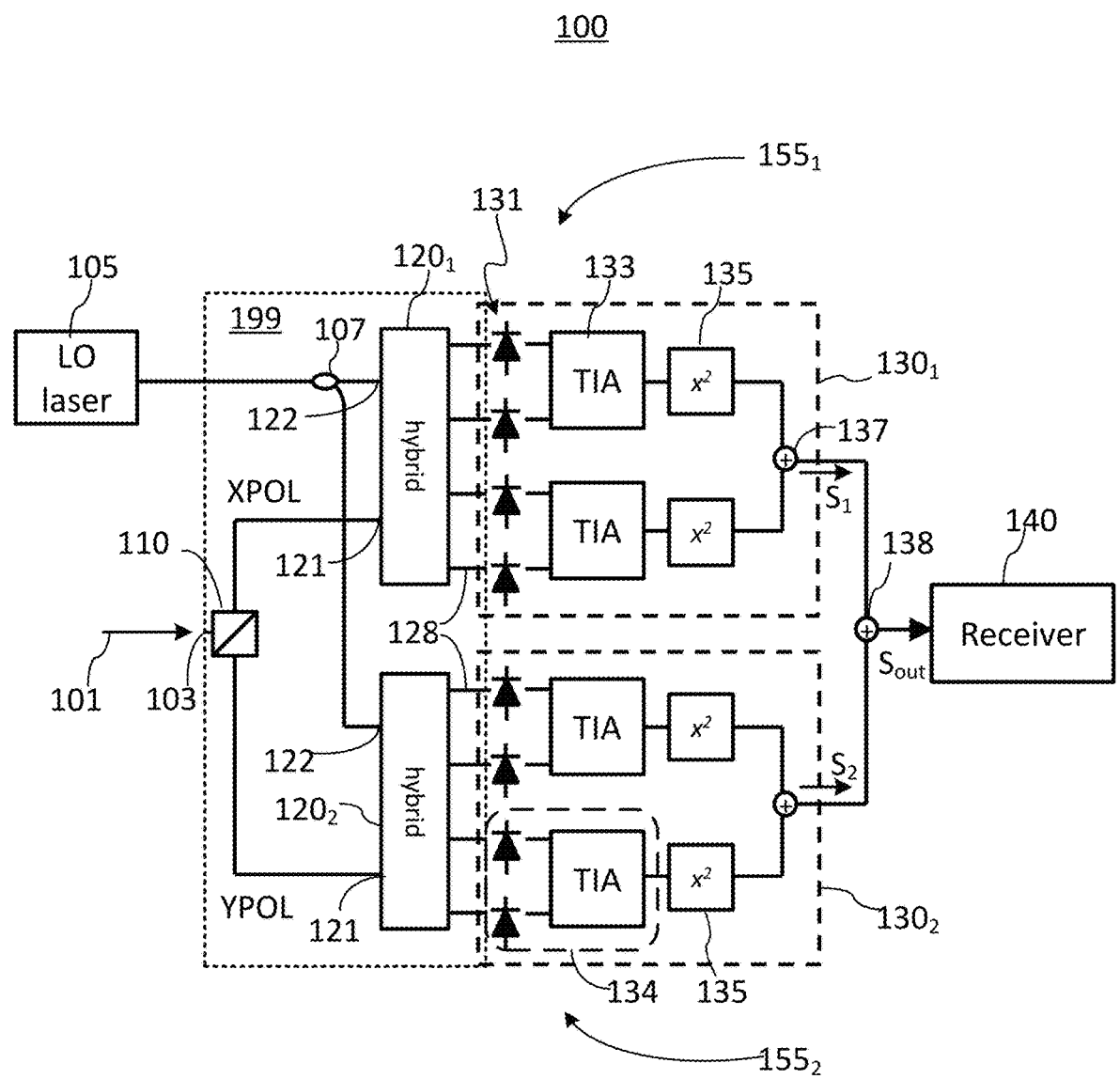
FIG. 3 is a schematic block diagram of a coherent optical receiver with polarization and phase diversity for receiving AM optical signals.

Turning now to FIG. 3, there is illustrated a coherent optical receiver (COR) 100 with polarization diversity. An optical front-end of COR 100 may be conveniently implemented with a photonic integrated circuit (PIC) 199, for example using planar waveguide formed in semiconducting or dielectric materials. Non-limiting examples of such materials and material systems include silicon (Si) or silica, including silicon-on-insulator (SOI), gallium arsenide (GaAs), indium phosphide (InP), or corresponding compounds. A PIC implemented with planar waveguides may preferentially support a particular polarization of light. An optical signal at the end of a fiber link may however be at any arbitrary polarization, which typically changes over time. To account for this discrepancy, COR 100 implements a polarization diversity approach, in which received AM signal light 101 is first decomposed into two orthogonal polarization components, which may be referred to herein as the first and second polarization components, or as the X-polarization and the Y-polarization, respectively. One of these two polarization components may correspond to a polarization mode, typically a TE mode or a TM mode, which is preferentially supported by the PIC 199 implementing the receiver's optical front end. The other of the two polarization components of the received signal light 101 may then be converted to the supported polarization mode so it can propagate in the PIC. Light signals of the two polarization components, which are demoted in FIG. 3 as "XPOL" and "YPOL" respectively, may then be separately processed using phase diversity and envelope detection, generally as described hereinabove with reference to FIG. 2, using two parallel PDAM detectors 155₁ and 155₂ to coherently detect AM signals in two orthogonal polarizations of the received signal light 101. The PDAM detectors 155₁ and 155₂ may each be an embodiment of the PDAM detector 55 described hereinabove, and may be generally referred to as PDAM detector 155. The resulting electrical power signals $S_1$ and $S_2$ at the outputs of the PDAM detectors 155₁ and 155₂ may be combined electronically to obtain an output electrical signal $S_{out}$ which accounts for both polarization components of the received optical signal and which is modulated with the AM signal generated at the transmitter.

The modulation format of the received signal light 101 may, for example, be OOK/NRZ (On-Off Keyed Non Return to Zero), OOK RZ (Return to Zero), PAM4 (Pulse Amplitude Modulated 4 level), or a higher level PAM format. The description hereinbelow may refer to PAM4 for clarity, but the approaches, techniques and structures described herein may be used in application to other modulation formats.

In the embodiment illustrated in FIG. 3, PIC 199 implementing the optical front-end of COR 100 includes at its input a polarization beam splitter (PBS) 110, which may also be referred to herein as the first PBS, and which may incorporate a polarization rotator at one of its two output ports. PBS 110 is configured to split the received AM signal light 101 received in its input port 103, in dependence on its polarization, into X-polarization light "XPOL" and a Y-polarization light "YPOL". Output ports of PBS 110 connect to first and second OHs 120₁ and 120₂, each of which may be a 90° OH having a signal port 121, an LO port 122, and four output ports, and which may be commonly referred to as OH 120. The input port 103 of PBS 110 may form an optical input port of COR 100, or may be optically coupled thereto. The signal port 121 of the first OH 120₁ may be coupled to a first output port of PBS 110 for receiving the XPOL light, while the signal port 121 of the second OH 120₂ may be coupled to a second output port of PBS 110 for receiving YPOL light. LO ports 122 of the two OHs 120 may be coupled to one or more LO lasers for providing the LO light for mixing with the respective polarization components of the signal light, as generally described hereinabove. Conveniently, the same LO laser 105 may be used for both OHs 120 using an optical splitter 107.

COR 100 further includes a first OE converter 130₁, which is coupled to the output optical ports of the first OH 120₁ and is configured to produce a first electrical power signal $S_1(t)$ responsive to the amplitude modulation of the received signal light 101. A second OE converter 130₂ is coupled to the output optical ports of the second OH 120₂ and is configured to produce a second electrical power signal $S_2(t)$ responsive to the amplitude modulation of the received signal light 101. The first and second OE converters 130₁, 130₂, which may be commonly referred to as the OE converter(s) 130, may each be an embodiment of the OE converter 30 described hereinabove. Each OE converter 130 includes two differential detectors 134, two squaring circuits 135 for squaring electrical signals produced by the two differential detectors, and a first summing circuit 137 for combining electrical signals produced by the two squaring circuits 135. Each differential detector 134 may be formed with two PDs 131 optically coupled to two output ports of one of the two OHs 120, generally as described hereinabove with reference to the differential detector 34 and the OH 20, and a differential amplifier 133 electrically connected to the two PDs 131. The differential amplifiers 133 may be for example trans-impedance amplifiers (TIA) that are configured to convert a difference between photocurrents generated by the two PDs 131 connected to the TIA inputs into a voltage signal. The combined output signal $S_{out}(t) \sim [S_1(t)+$ $S_2(t)$] may then be provided to an electrical receiver circuit 140 for further processing and/or extracting the data signal that was used at the transmitter to modulate the optical signal.

Both OHs 120 may be integrated with the PBS 110 within the same PIC 199, which may be implemented with planar optical waveguides in a single photonic chip. In other embodiments PIC 199 may be implemented with two or more optically connected chips. By way of example, in some embodiments PIC 199 may be implemented in a SOI chip, for example in a Si layer thereof. PBS 110 and the OHs 120 may be implemented for example using one or more waveguide structures such as 2D grating couplers, waveguide tapers, bi-layer couplers and/or tapers, directional couplers, MMI couplers, and may be connected by planar optical waveguides. The optical splitter 107 for splitting the LO light between the two OHs 120 may be integrated into the same PIC 199, for example in the same photonic chip. The waveguides implementing the PIC may be configured to preferentially support the TE mode; in such embodiments, PBS 110 may be configured to split the received signal light 101 into the TE and TM mode, and then rotate the TM polarization to convert light of the TM mode to the TE mode, so that both optical hybrids 120 receive light in the TE mode. In other embodiments the PIC implementing the optical circuitry of COR 100 may be configured to predominantly support a TM mode, with the PBS 110 converting the TE mode to TM at one of its outputs. Embodiments may also be envisioned where one of the OHs 120 operates in a TE mode, and another—in the TM mode.

In some embodiments the PDs 131 may be in the form of one or more separate components that are optically coupled to the photonic chip implementing PIC 199. In some embodiments the PDs 131 may be integrated in the photonics chip. The differential amplifiers 133, the squaring circuits 135, and the first summing circuits 137, 138 may be implemented with high-bandwidth electrical circuits in a separate electronic chip, or with two or more chips. In some embodiments these electrical components may be implemented in a same chip with the PBS 110 and the OHs 120, for example using silicon photonics and CMOS technology. In some embodiments, and in some material systems, the LO laser 105 may be provided on a same chip with the PBS 110 and OHs 120, or it may be a separate chip or component.

Figure 4:
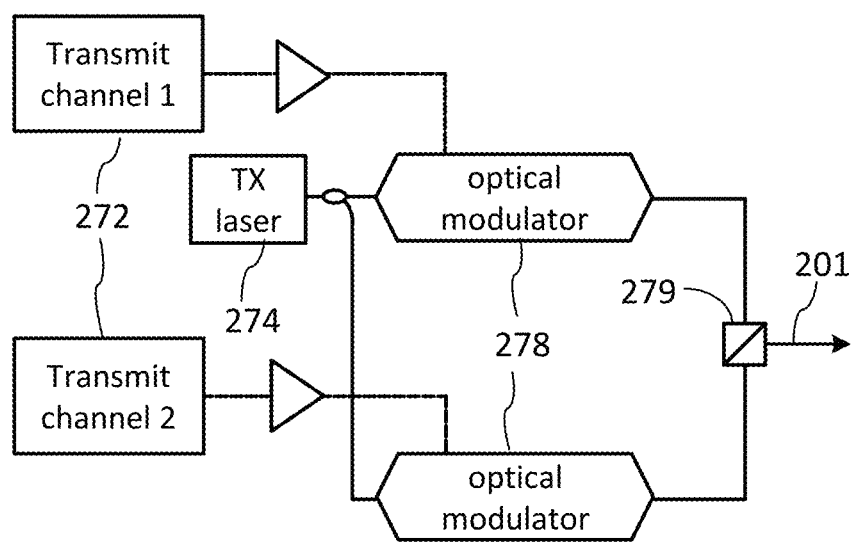
FIG. 4 is a schematic diagram of a high-speed optical transmitter for transmitting polarization multiplexed (PM) AM optical signals.
Figure 5:
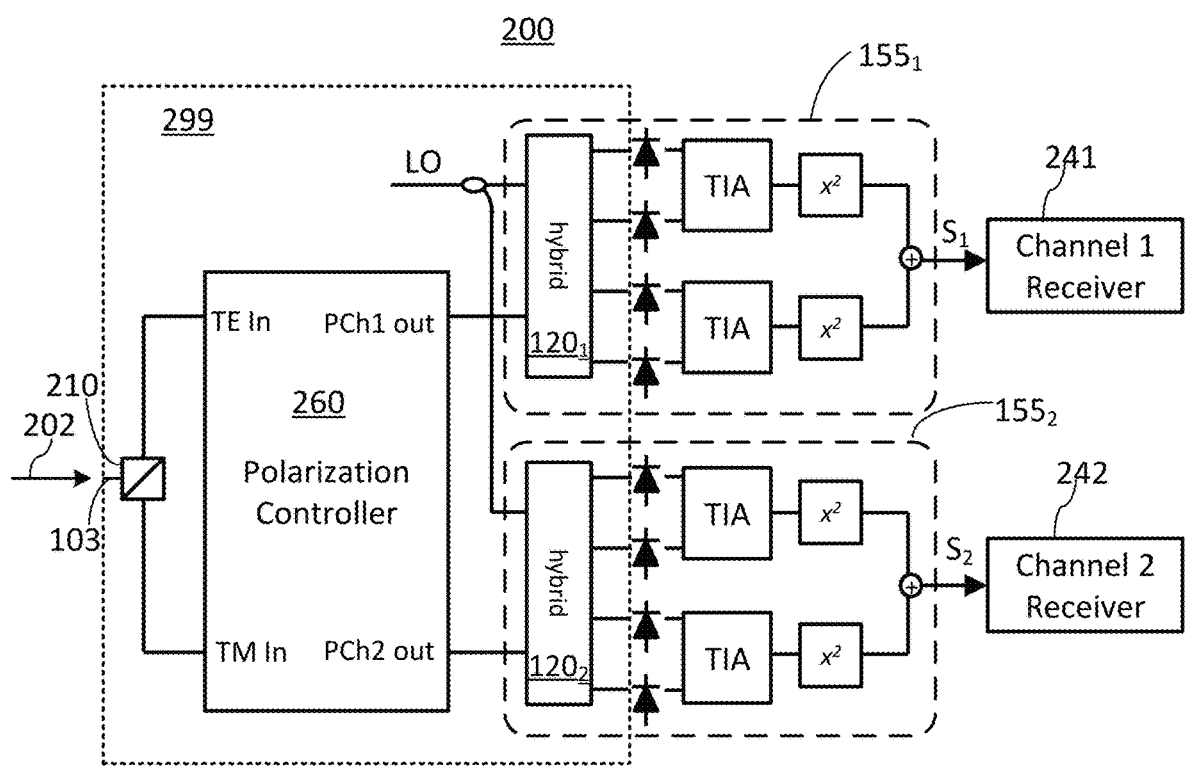
FIG. 5 is a schematic diagram of a coherent optical receiver with phase diversity for receiving the PM AM optical signals.

COR 100 includes two PDAM detectors 155₁ and 155₂ which are configured to separately detect AM signals in two polarization components of the input signal light, and which outputs are summed to produce an electrical output signal wherein the AM signals from the two polarizations are combined. COR 100 may however be modified to receive signal light wherein two orthogonal polarizations carry different AM signals. FIGS. 4 and 5 illustrate an example optical transmitter 270 that may be used to generate polarization multiplexed amplitude-modulated (PMAM) signal light, and an example COR 200 that is configured to receive such signals. Advantageously, the use of PM transmission allows doubling the spectral density of transmitted information compared to TX 10 and COR 100.

Referring to FIG. 4, in the optical transmitter 270 two separate drive signals, which carry data signals of two different transmit channels, are provided from two data sources 272 to two optical modulators 278. The optical modulators 278 may be for example two MZMs configured to output two light signals that are modulated in amplitude or, equivalently, in intensity. A same TX laser 274 may be used as the light source for both optical modulators 278. Alternatively, two different sources of coherent light may be used. The AM light signals from the outputs of the two optical modulators 278 may then be polarization multiplexed, i.e. combined in orthogonal polarizations, using a polarization combiner 279 to produce PMAM signal light 201 in the form of a single beam of light. The PMAM signal light 201 carries information in two TX-defined polarization channels, which may be referred to herein as a first PM Channel (PCh1) and a second PM channel (PCh2). The PMAM signal light 201 may be then transmitted over an optical fiber link (not shown) to a target destination where it can be received, de-multiplexed, and de-modulated by a suitably configured COR 200, an example of which is illustrated in FIG. 5. The two TX-defined polarization channels PCh1 and PCh2 may get intermixed during the transmission in the fiber link, and may need to be adaptively separated at the receiver.

Referring to FIG. 5, COR 200 may be generally similar to COR 100, except that PIC 299 implementing the optical front-end of COR 200 additionally includes a polarization controller (PC) 260 connected optically in a signal path between PBS 210 and the OHs 120 of the two PDAM detectors 155₁ and 155₂. PBS 210 may be an embodiment of the first PBS 110 described above. Furthermore, COR 200 lacks an output summing circuit, so that the electrical power signals $S_1(t)$ and $S_2(t)$ at the outputs of the two PDAM detectors 155₁, 155₂ can be processed separately to extract the data signals of the two transmit channels PCh1 and PCh2 they carry. In the illustrated embodiment, the electrical power signal $S_1(t)$ from the output of the first PDAM detector 155₁ is provided to a first electrical receiver circuit 241 implementing a first channel (PCh1) receiver, and the electrical power signal $S_2(t)$ from the output of the second PDAM detector 155₂ is provided to a second electrical receiver circuit 242 implementing a second channel (PCh2) receiver.

PC 260 is a dual-channel PC, and may be referred to herein as the dual PC 260; it has two input ports, which are indicated in FIG. 5 as "TE in" and "TM in" and are coupled to the respective output ports of the PBS 210. Two output ports of PC 260, which are indicated in FIG. 5 as "PCh1 out" and "PCh2 out", are optically coupled to the input signal ports of the OHs 120 of the first and second PDAM detectors 155₁, 155₂. The dual PC 260 is configured to extract the two TX-defined polarization channels PCh1 and PCh2 from the PMAM signal light 202 received at the input port 103 of PBS 210, which may also function as the input optical port of COR 200. The two TX-defined polarization channels PCh1 and PCh2 are intermixed in the received PMAM signal light 202, so that they may also be intermixed in each of the two outputs of PBS 210. The dual PC 260 is operable to effectively rotate the polarization received at its two input ports so that the TX-defined first and second PM channels PCh1 and PCh2 are separated and output from different output ports of the dual PC 260. Advantageously, the dual PC 260 may be implemented with planar waveguides and incorporated in a same PIC 299 with the PBS 210 and the first and second OHs 120. In some embodiments PIC 299 may be implemented with a single chip.

Figure 6:
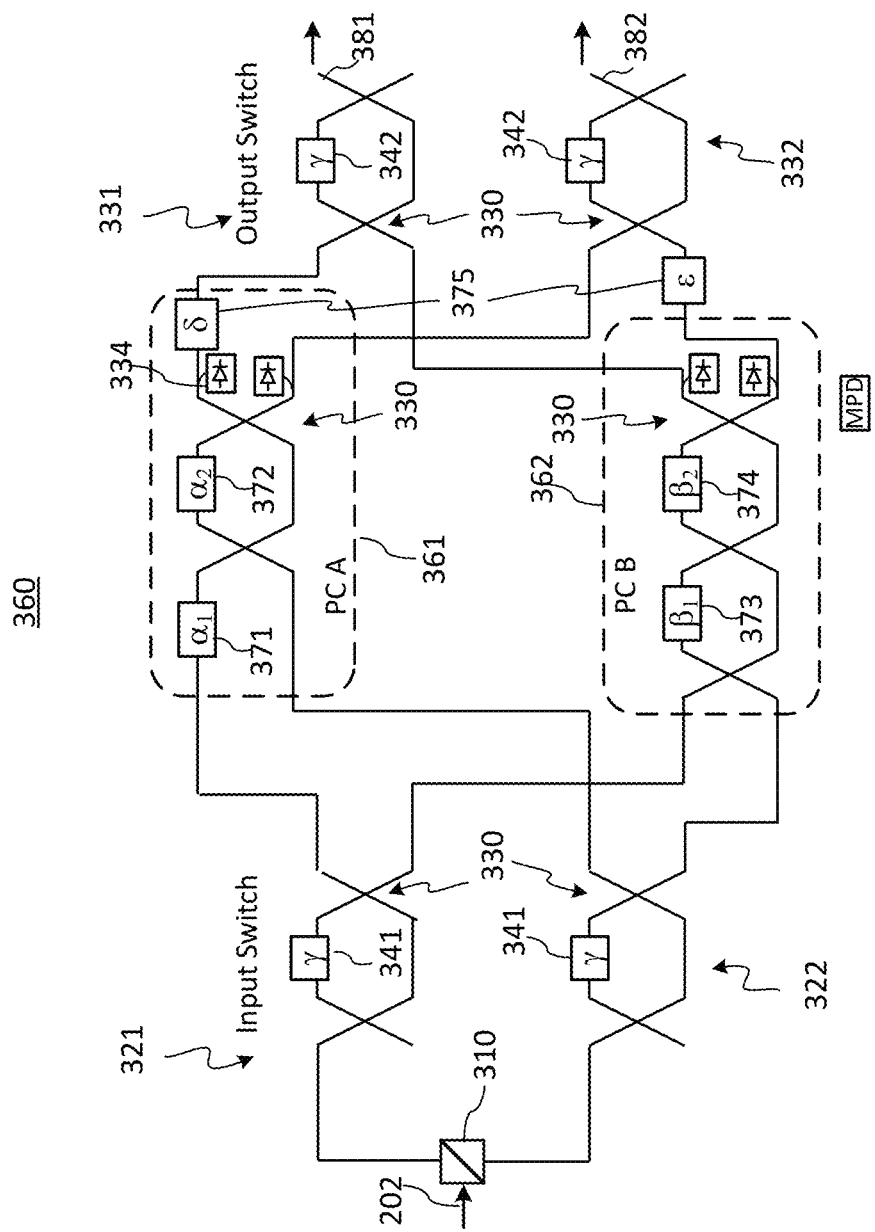
FIG. 6 is a schematic diagram of an example dual polarization controller (PC) embodied with MZIs in a PIC.
Figure 9:
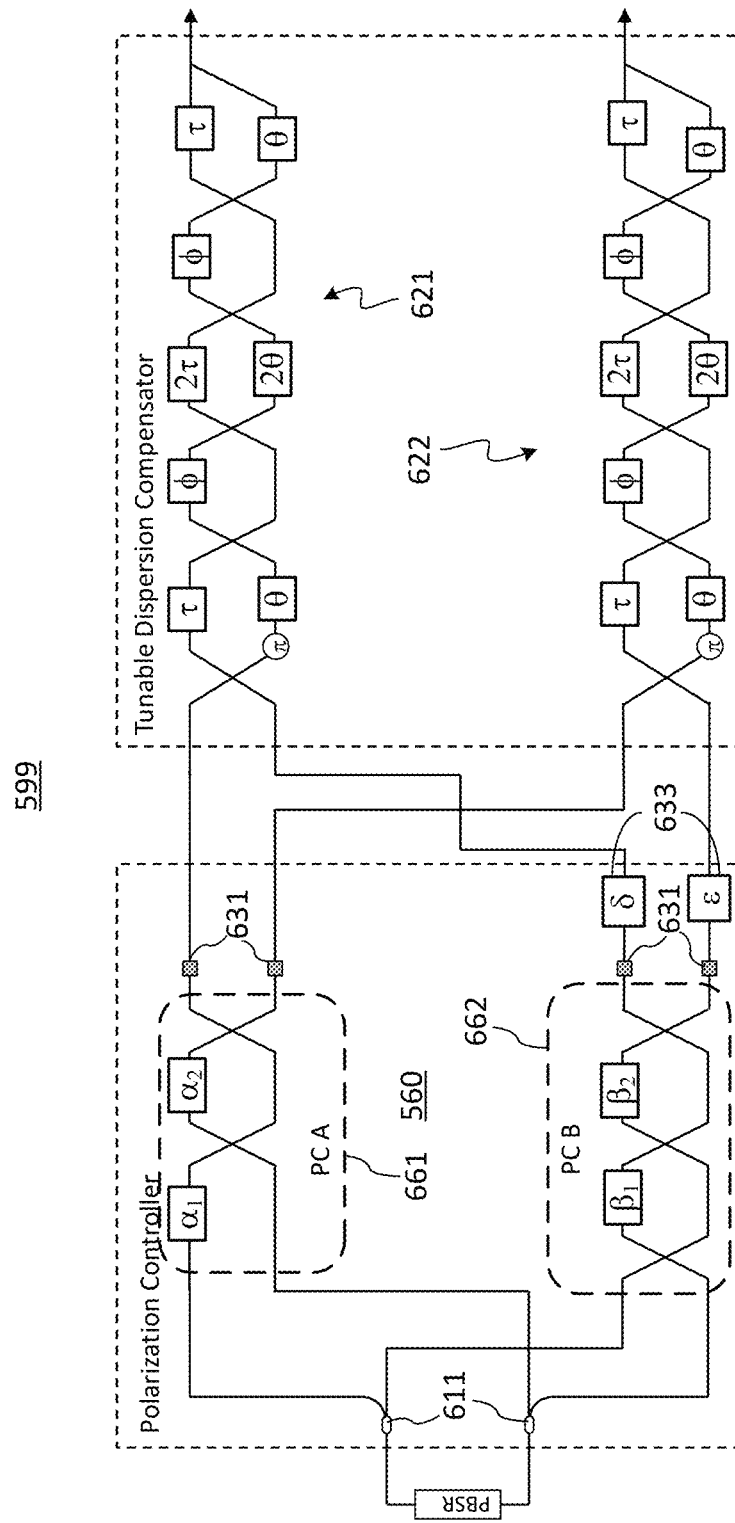
FIG. 9 is a schematic optical circuit diagram of a "broadcast and select" embodiment of a tunable dual PC followed by two TDCs that may be implemented in a receiver PIC.

Referring to FIG. 6, there is illustrated an example PC 360 which may embody the dual PC 260 of COR 200. PC 360 is a dual channel PC formed by a network of 2×2 directional couplers 330 and tunable phase shifters 341, 371-375. Such a coupler network may be formed substantially with four optical waveguides, such as for example planar optical waveguides formed in a photonics chip. The tunable phase shifters 341, 371-375 may be implemented with thermal, electro-optic, magneto-optic, injection-type, and other types of actuators locally acting upon the waveguides at desired locations to locally tune its refractive index. Polarization controllers of this type that are capable of endless polarization control are described, for example, in U.S. patent application Ser. No. 15/840,223 entitled "Method and circuit for endless phase and polarization control", which is assigned to the assignee of the present application and is incorporated herein by reference. In the illustrated embodiment the network of couplers 330 forms two single-channel PCs 361 and 362, which may be referred to hereinafter simply as PC 361 and PC 362, respectively, and which are connected in parallel between a 2×4 switch at an input side, and a 4×2 switch at the output side. The input 2×4 switch is formed of a pair of 1×2 switches 321, 322. The output 4×2 switch is formed of a pair of 2×1 switches 331, 332. Input ports of the 1×2 switches 321, 322 are connected to outputs of a PBS 310, which may embody the first PBS 210 of COR 200. In the illustrated embodiment each of the switches 321, 322, 331, 332 is in the form of a switchable Mach-Zehnder interferometer (MZI) having a tunable phase shifter 341 in one of its arms to effect the switching. In some embodiments input switches 321, 322 may be replaced by optical splitters, as illustrated in FIG. 9. Each of the two single-channels PCs 361 and 362 includes two 2×2 directional couplers 330 connected in series and two tunable phase shifters, such as phase-shifters 371, 372 in PC 361 or phase shifter 373, 374 in PC 362. One of the single-channel PCs 362 or 361 may include an additional coupler at its input. To account for the phase shift associated with differences in the optical path between PC 361 and PC 362, tunable phase shifters 375 may be provided either at the two outputs of one of PC 361 or PC 362, or at one of the outputs of each PC 361 and PC 362, as illustrated in FIG. 6 by way of example.

In operation, PBS 310 splits input light according to its polarization, sending e.g. an X-polarization to the first input switch 321 and a Y-polarization to the second switch 322. The X-polarization may correspond to a component of the received signal light 202 that is coupled to the TE mode of the PIC where PBS 310 is implemented, while the Y-polarization may correspond to a component of the received signal light 202 that is coupled to the TM mode of the PIC. The tunable phase shifters 341 of the switches 321, 322 may be controlled by an electronic controller (not shown) to direct each of the X-polarization light and Y-polarization light to either the first single-channel PC 361 or the second single-channel PC 362. Each of the single-channel PCs 361, 362 is operable to mix the X-polarization light and the Y-polarization light to provide two light outputs in which the X- and Y-polarizations are combined in variable proportions and with a tunable phase shift. The output switches 331, 332 are operable to select which two outputs of the PCs 361 and 362 are directed to the two output ports 381, 382 of PC 360. The dual PC 360 may operate as a polarization demultiplexer, for example using feedback from one or more monitoring photodiodes (MPD) 334 that may be coupled at the outputs of the PCs 361, 362. A dither signal imposed upon one of the polarizations at the TX may be used to provide a feedback signal to the controller that controls the tunable phase shifters 341, 342, 371-374. The output ports 381, 382 may be connected to the signal ports of the two OHs 120 of COR 200, respectively, to provide signal inputs to the PDAM detectors $155_1$ and $155_2$.

Figure 7:
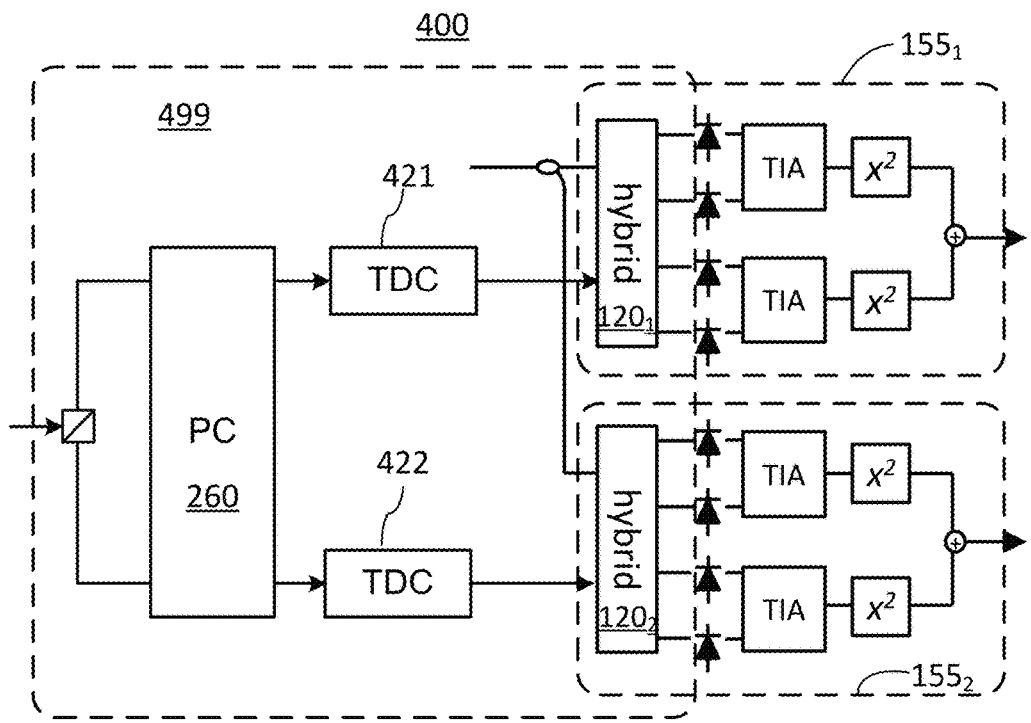
FIG. 7 is a schematic block diagram of an embodiment of the coherent optical receiver of FIG. 5 with a tunable dispersion compensator (TDC) in each polarization channel.

Referring to FIG. 7, there is illustrated a COR 400 including an optical front-end in the form of PIC 499 according to an embodiment. COR 400 may be viewed as an embodiment of COR 200 with two added tunable dispersion compensators (TDC) 421 and 422 connected between the output ports of the PC 260 and the signal ports of the OHs 120 of the first PDAM detector $155_1$ and the second PDAM detector $155_2$, respectively. Chromatic dispersion in optical fibers may be an impairment to the coherent AM detection disclosed herein. For this reason, optical wavelengths carrying signals in fiber-optic communication systems are typically chosen to operate in spectral regions where the fiber has a minimum in dispersion. Some optical communication systems, such as for example some Dense Wavelength Division Multiplexing (DWDM) systems, may operate at wavelengths where optical fiber links have an elevated chromatic dispersion. In these situations, dispersion compensating fiber (DCF) is typically used to undo the effect of the transmission fiber dispersion. In either case some amount of residual dispersion remains, and may limit the reach of the communication system at a high symbol rate. Advantageously, TDCs 421 and 422 implemented in the PIC 499 of COR 400 may be controlled to tunably add wavelength-dependent delays to the optical signals at the output of PC 260, thereby at least partially compensating for the chromatic dispersion in the optical fiber link.

Figure 8:
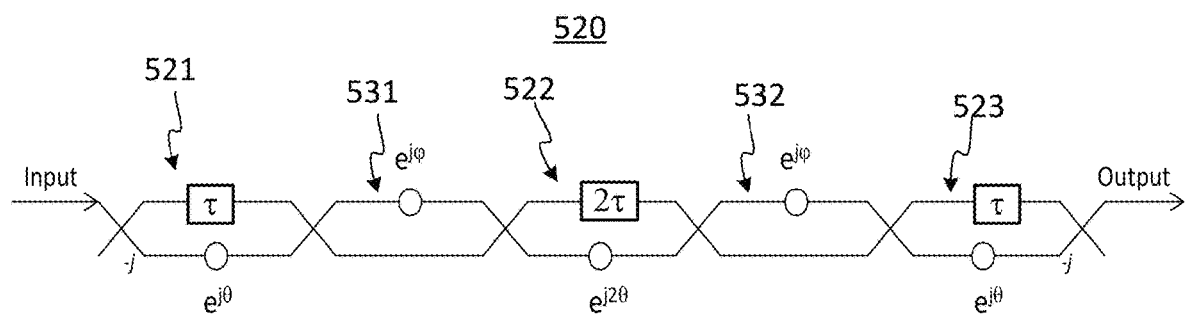
FIG. 8 is a schematic diagram of an example TDC embodied in a PIC with a cascade of tunable MZIs.

Referring to FIG. 8, there is illustrated an example TDC 520 which may be used to implement the TDC 421 and/or TDC 422 of COR 400. TDC 520 may be readily implemented with planar optical waveguides in a PIC based receiver. TDC 520 may be embodied as a cascade of 2×2 waveguide couplers forming three or more MZI stages. In the illustrated embodiment, TDC 520 includes three length-imbalanced MZI stages 521, 522, and 523. Two additional tunable MZIs 531, 532 implement tunable couplers between successive length-imbalanced MZI stages 521, 522 and 522, 523. The three length-imbalanced MZI stages 521, 522, and 523 have length-imbalanced arms, as indicated in the figure by the inclusion of time delay elements $\tau$, $2\tau$, and $\tau$, respectively. The amount of dispersion compensation provided by TDC 520 may be controlled by tuning phase shifters incorporated into the arms of the tunable MZIs 531 and 532, and in at least some embodiments by phase-shifters incorporated into the arms of one or more of the length-imbalanced MZI stages 521, 522, 523.

FIG. 9 illustrates an example PIC 599 including a PC 560 followed optically by two TDCs 621 and 622. PC 560 is a dual-channel PC that may implement PC 260 of COR 400, while TDCs 621, 622 may implement the TDCs 421, 422 of COR 400, respectively. Thus, PIC 599 may represent a portion of PIC 499 of COR 400, up to the OHs $120_1$, $120_2$. In the illustrated embodiment PC 560 is a "broadcast and block" variation of the dual PC 360 shown in FIG. 6, with two optical splitters 611 replacing the input switches 321, 322 of PC 360, and two pairs of optical blockers 631 replacing the output switches 331, 332. The optical blockers 631 may be implemented for example with variable optical attenuators (VOAs). The optical splitters 611 may be, for example, 50:50 splitters, which are used to broadcast the input optical signal to both the first single-channel PC 661 and the second single-channel PC 662. The output signals of the dual PC 560 may be selected from the outputs of the two single-channel PCs 661, 662 using the optical blockers 631, 632. Optical phase shifters 633 may be disposed at the output of PC 662 to account for optical path differences between PC 661 and PC 662. The added phase shift allows TDC control values to remain the same independent of which single-channel PC is being used.

FIGS. 10-16 show example configurations of optical transmitters and optical coherent receivers for AM transmission in four subchannels; such transmitters and receivers may be used, for example, for transmitting 400 Gbps PAM4 signals using four subchannels of 100 Gbps each. A TDC function may be included in each of the receivers generally as described hereinabove, but is omitted to simplify the diagrams. Each of the coherent optical receivers illustrated below may be conveniently embodied with a single PIC chip, for example in a silicon photonics platform, and one or more electronic integrated circuits (IC). In some embodiments a single semiconductor chip may be used to implement the optical front-end and PDAM detectors of the receivers.

Figure 10:
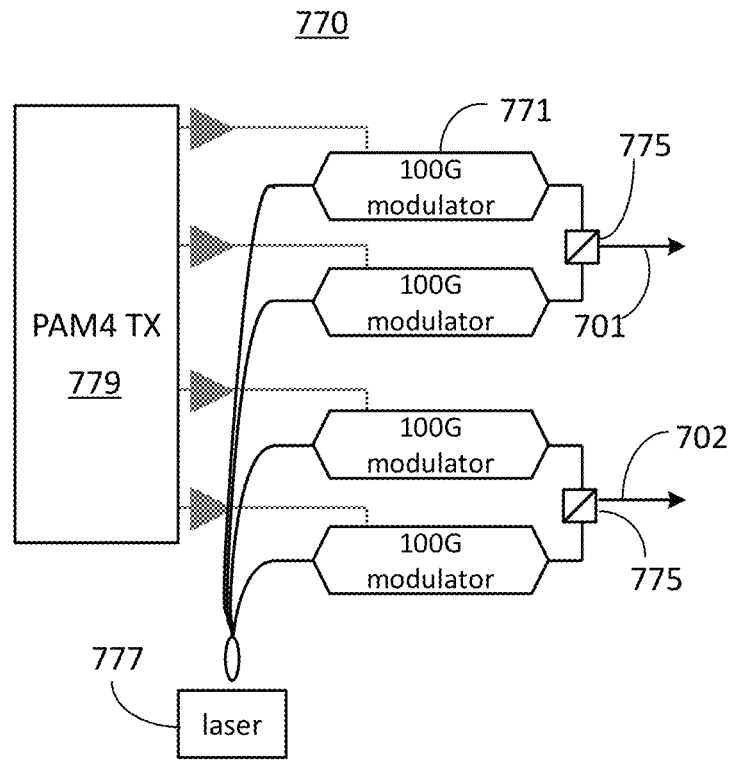
FIG. 10 is a schematic block diagram of an optical PM AM transmitter for transmitting four optical channels over two optical fibers using a shared laser source.

Referring first to FIG. 10, there is schematically illustrated an example optical transmitter 770 that is configured to transmit four data channels over two optical fibers by combining two channels onto a single fiber using polarization multiplexing. In the illustrated embodiment light from a single laser 777 is fed into four MZMs 771 using a four-way beam splitter. AM signal light at the output of each MZM 771 is then combined pairwise by polarization multiplexing using two polarization beam combiners 775. In other embodiments two lasers each followed by a 1×2 beam splitter may be used, or a separate laser may be used to feed each MZM 771. A high-speed data source 779 may be used to generate four electrical drive signals to drive the four MZMs 771. Each MZM 771 may be configured, e.g. biased, to impose upon the laser light passing through it an amplitude modulation of a desired format. By way of example, transmitter 770 may be a PAM4 transmitter, and the data source 779 may be configured to transmit an electrical PAM4 signal in the form of four 100 Gbps (Giga-bit per second) bit streams, which are then used to drive the four MZMs 771 in parallel. Each MZM 771 may be for example a travelling-wave MZM configured for 100 Gbps intensity modulation of light. Transmitter 770 outputs two PMAM light signals 701, 702 each of which carrying two of the four data channels over s separate optical fiber. In some embodiments all four MZMs 771 and the two polarization combiners 775 may be embodied as a PIC in a single chip.

Figure 11:
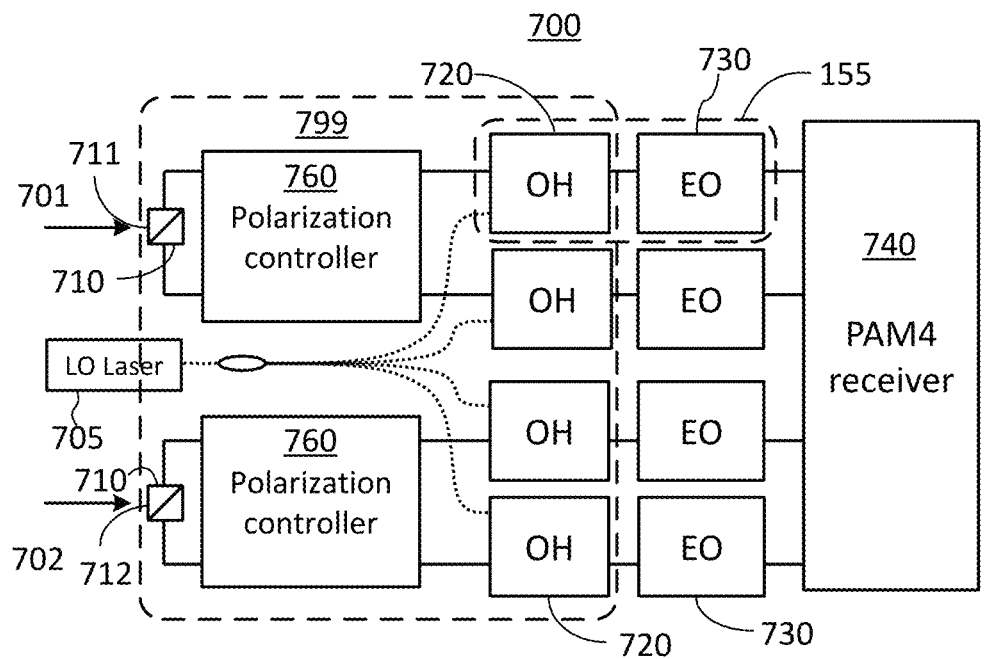
FIG. 11 is a is a schematic block diagram of a coherent optical receiver for receiving PM AM signals generated with the optical transmitter of FIG. 10.

FIG. 11 illustrates an example COR 700 that is configured to receive the two PMAM optical signals generated by transmitter 770. COR 700 may be viewed as two instances of COR 200 integrated in a single receiver. COR 700 has two input optical ports 711, 712 which may be mated to the two optical fibers carrying the PMAM light signals 701 and 702. These light signals are separately polarization demultiplexed using two PBS 710 followed by two dual-channel PC 760 connected in parallel. Each of PBS 710 may be as described above with reference to PBS 110, 210, or 310. The demultiplexed polarization channels from outputs of each PC 760 are separately fed to two PDAM detectors 155, each of which composed of an OH 120 followed by an OE converter 130, as described hereinabove with reference to COR 100 and COR 200. Each OE converter 130 converts optical signals from the output ports of the corresponding OH 120 to an electrical power signal carrying one of the four data channels defined at the transmitter. Thus COR 700 includes two PBSs 710, two dual-channel PCs 760, and four OHs 120, which may all be implemented in a single PIC 799. In the illustrated embodiment a single LO source is used to provide the LO light to all four OHs 120; in other embodiments, different LO sources may be used for each OH, or for each OH pair. The dual channel PCs 760 may be generally as described hereinabove, for example with reference to dual-channel PCs 260, 360, and 560. The OE converters 730 may be embodied for example as described above with reference to the OE converters 30, 130 and PDAM detectors 55 and 155. An electrical receiver circuit 740 may be used to perform desired signal processing on the electrical power signals from the four OE converters 730. In an example embodiment wherein the PMAM optical signals 701, 702 received by COR 700 represent a 400 Gbps PAM4 signal, the electrical receiver circuit 740 may be configured to reconstruct the transmitter-defined 400 Gbps bit stream from the four electrical power signals from the four OE converters 130.

Figure 12:
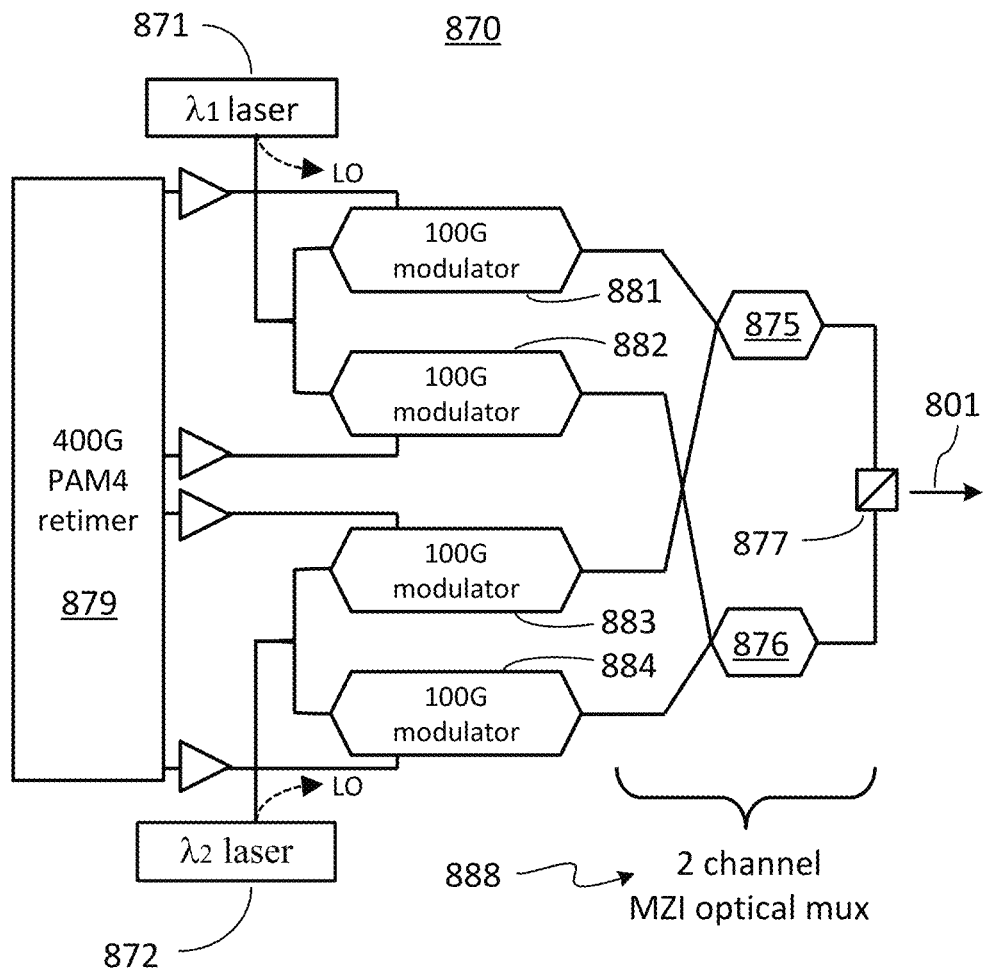
FIG. 12 is a schematic block diagram of an optical PM AM transmitter with wavelength multiplexing for transmitting four optical channels over two wavelengths in a same optical fiber.

With reference to FIG. 12, there is schematically illustrated an example optical transmitter 870 that is configured to transmit four data channels over a single optical fiber by wavelength multiplexing two PM channels. A data source 879 provides four electrical drive signals, each carrying a respective signal subchannel, to four MZMs 881-884 to modulate light propagating therein in amplitude. Light from a first laser 871 emitting at a first wavelength λ1 is split and fed in parallel into a first MZM 881 and a second MZM 882. Light from a second laser 872 emitting at a second wavelength λ2 is split and fed in parallel into a third MZM 883 and a fourth MZM 884. Outputs of the first and third MZMs 881, 883 are wavelength multiplexed using a first wavelength multiplexer (MUX) 875, while outputs of the second and fourth MZMs 882, 884 are wavelength multiplexed using a second wavelength MUX 876. In the illustrated embodiment the optical MUXs 875, 876 are embodied with waveguide MZIs; other embodiments may utilize different waveguide structures for the wavelength multiplexing, including but not limited to micro-ring resonators (MRR), Echelle gratings, and arrayed waveguides. Wavelength multiplexed light from the outputs of the wavelength MUXs 875, 876 are then polarization multiplexed into a signal light 801 which carries two PM signal channels on each of the two wavelengths. The signal light 801 can then be transmitted over a single optical fiber. In some embodiments all four MZMs 881-884, the two wavelength MUXs 875, 876, and the polarization combiner 877 may be embodied as a PIC in a single chip.

By way of example, transmitter 870 may be configured as a PAM4 transmitter, with the data source 879 configured for transmitting an electrical PAM4 signal in the form of four bit streams at a target bit rate that the MZMs 881-884 can support, for example 100 Gbps. These four bit streams are used to drive the four MZMs 881-884, each of which configured to provide intensity modulation at the target bit rate in response to receiving the drive signal at the target bit rate. The signal light 801 transmitted by the transmitter 870 may then carry for example 400 G PAM4 data signal over a single optical fiber in two PM wavelength channels.

Figure 13:
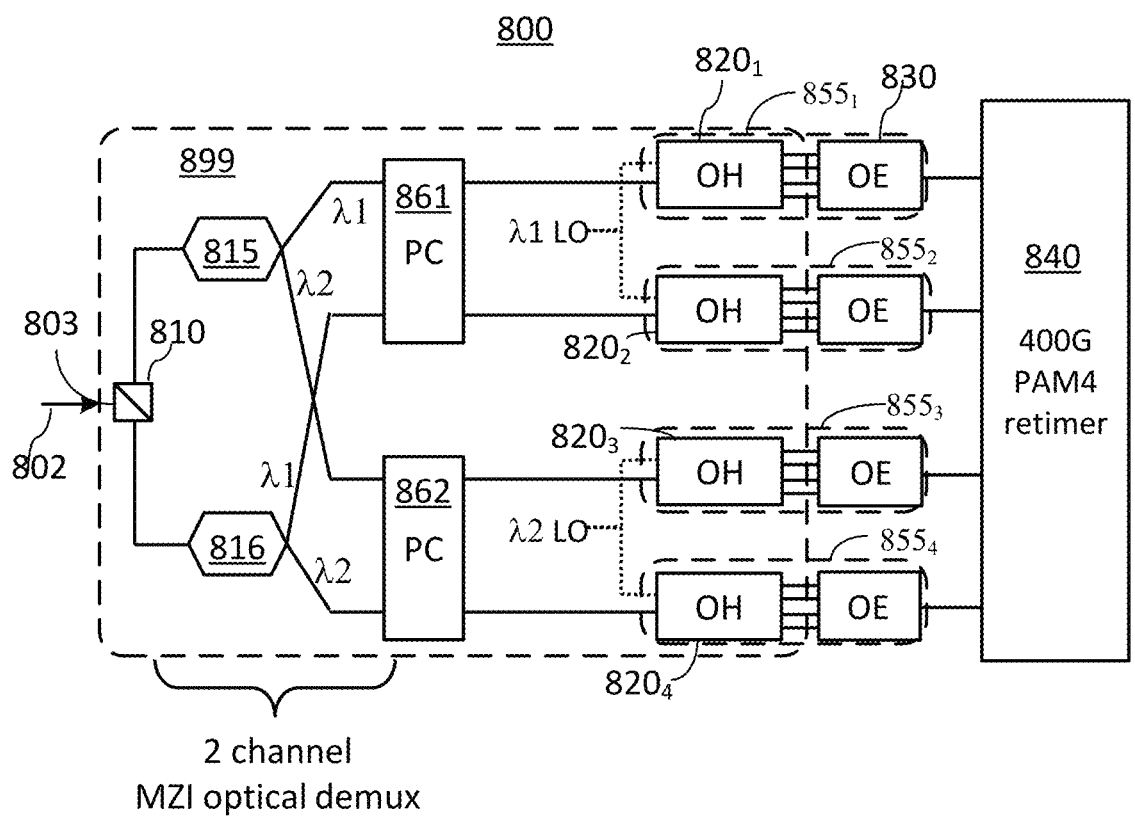
FIG. 13 is a schematic block diagram of a coherent optical receiver for receiving wavelength-multiplexed PM AM signals generated with the optical transmitter of FIG. 12.

FIG. 13 illustrates an example COR 800 configured for receiving and demultiplexing signal light 802 carrying two PM wavelength channels. Signal light 802 may represent signal light 801 transmitted by TX 870 after propagating through a fiber optic link, and may be referred to as the received signal light 802. In the illustrated embodiment COR 800 has an optical front-end in the form of a PIC 899, which may include a PBS 810, two wavelength deMUXs 815, 816 connected to respective outputs of the PBS 810, and two dual PCs 861, 862 configured to perform separate polarization demutuplexing on the outputs of deMUXs 815 and 816. The two dual PCs 861 and 862 output four demultipelxed AM light signals; these four AM light signals are fed in parallel to four PDAM detectors $855_i$, i=1, 2, 3, or 4, for converting to four electrical power signals. Each of the PDAM detectors 855, may be an embodiment of the PDAM detector 55 or 155 described above, and may include a 90° OH 820, followed by a respective OE converter 830, which may be an embodiment of the OE converter 30 or 130 as described above. In the illustrated embodiment the wavelength deMUXs 815 and 816 are embodied with waveguide MZIs; in other embodiments they may utilize different waveguide structures for the wavelength demultiplexing, including but not limited to micro ring resonators (MRR), Echelle gratings, and arrayed waveguides.

COR 800 may be viewed as a modification of COR 700 in which two input PBSs 711, 712 are replaced with a single PBS 810 followed by the two wavelength deMUXs 815, 816, and in which first and second OHs $820_1$ and $820_2$ are fed with LO signals at the first wavelengths $\lambda1$, while third and fourth OH $820_3$ and $820_4$ are fed with LO signals at the second wavelengths $\lambda2$. PBS 810 may be an embodiment of PBS 110 described hereinabove. PBS 810, or an input port 803 thereof, may function as an input optical port of COR 800. In operation the signal light 802 received in the input optical port 803 is first split into X-polarization signal and Y-polarization signal. The X-polarization signal may be guided to the first wavelength demultiplexer (deMUX) 815, while the Y-polarization signal may be guided to the second wavelength deMUX 816. The first wavelength deMUX 815 splits the X-polarization signal into two wavelength channels $\lambda1$ and $\lambda2$, sending the first wavelength $\lambda1$ to the first input port of the first PC 861 and the second wavelength $\lambda2$ to the first input port of the second PC 862. The second wavelength deMUX 816 splits the Y-polarization signal into two wavelength channels $\lambda1$ and $\lambda2$, sending the first wavelength $\lambda1$ to the second input port of the first PC 861 and the second wavelength $\lambda2$ to the second input port of the second PC 862. The first PC 861 is operable to perform the polarization demultiplexing of the first wavelength $\lambda1$, sending a first TX-defined polarization channel of the first wavelength $\lambda1$ to the OH $120_1$ of a first PDAM detector $855_1$ and a second TX-defined polarization channel of the first wavelength $\lambda1$ to the OH $820_2$ of a second PDAM detector $855_2$, where they are separately mixed with the LO light at the first wavelength $\lambda1$. The second PC 862 is operable to perform the polarization demultiplexing on the second wavelength $\lambda2$, sending the first TX-defined polarization channel of the second wavelength $\lambda2$ to the OH $820_3$ of a third PDAM detector $855_3$ and the second TX-defined polarization channel of the second wavelength $\lambda2$ to the OH $820_4$ of a fourth PDAM detector $855_4$, where they are separately mixed with the LO light at the second wavelength $\lambda2$. An electrical receiver circuit 840 may be used to perform desired signal processing on the electrical power signals from the four OE converters 830. In an example embodiment wherein the four subchannels of the light signal 802 carry a 400 Gbps PAM4 signal, the electrical receiver circuit 840 may be configured to reconstruct the transmitter-defined 400 Gbps bit stream from the four electrical power signals from the four OE converters 830.

Figure 14:
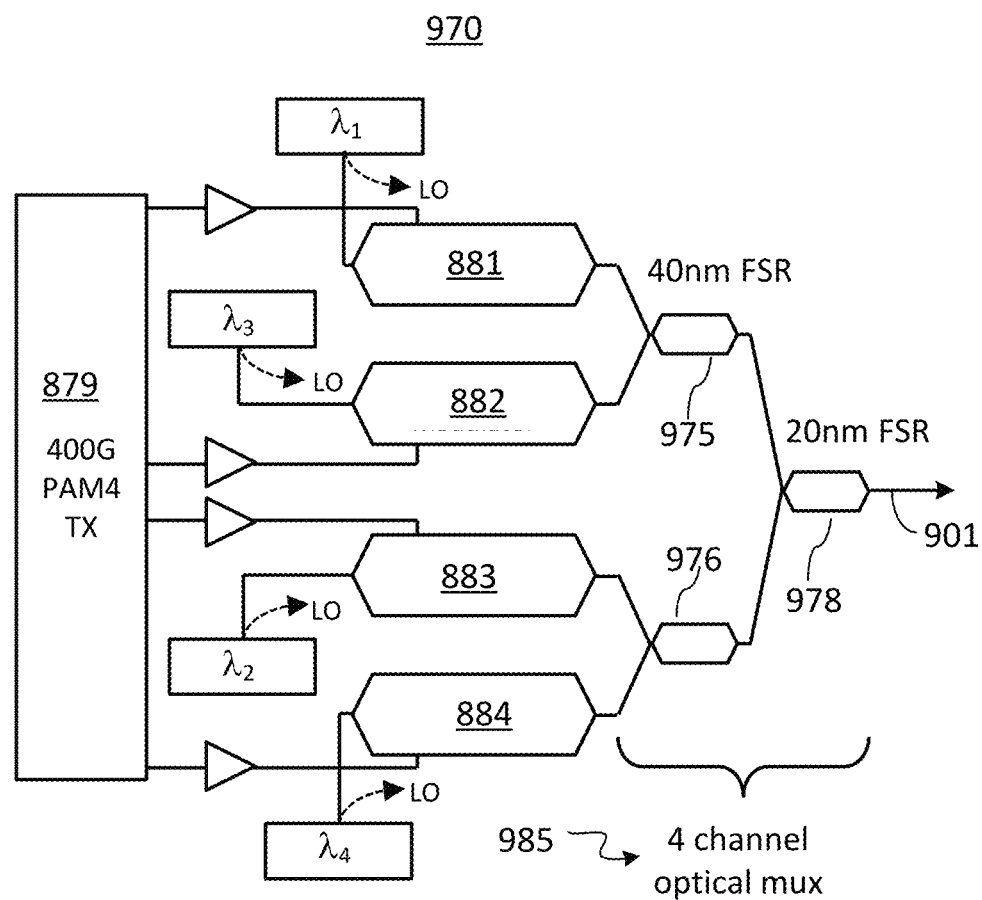
FIG. 14 is a schematic block diagram of an optical AM transmitter with wavelength multiplexing for transmitting four optical channels over four wavelengths in a same optical fiber.

With reference to FIG. 14, there is schematically illustrated an example optical transmitter 970 which is configured to multiplex four AM channels onto four different wavelengths without polarization multiplexing. Accordingly transmitter 970 may be viewed as a modification of transmitter 870 in which the polarization multiplexing stage is replaced with a second wavelength multiplexing stage, and in which each of the four MZMs 881-884 is fed light of a different wavelength $\lambda_1$, $\lambda_2$, $\lambda_3$, or $\lambda_4$. These four wavelength may be provided for example from four different lasers. In other embodiments a multi-wavelength laser source followed by a wavelength MUX may be used to feed two or more MZMs simultaneously. By way of example, a set of wavelengths on a 20 nm grid near the zero dispersion region of a single mode fiber (SMF) may be used, e.g. with $\lambda_1$=1271 nm, $\lambda_2$=1291 nm, $\lambda_3$=1311 nm, and $\lambda_4$=1331 nm. In other embodiments different sets of wavelengths with same or different spacing may be used.

Transmitter 970 further includes a two-stage wavelength MUX 985 wherein the first stage is in the form of two wavelength MUXs 975, 976 with 40 nm FSR (free spectral range) connected in parallel, which are followed by a 20 nm FSR wavelength MUX 978. The wavelength MUXs 975, 976, 978 may be embodied with MZIs as illustrated or with other suitable waveguide structures capable of wavelength multiplexing such as described above. In some embodiments all four MZMs 881-884 and the two-stage wavelength MUX 985 of transmitter 970 may be embodied as a PIC in a single chip.

By way of example, transmitter 970 may be configured as a PAM4 transmitter, with the data source 879 configured for transmitting an electrical PAM4 signal in the form of four bit streams at a target bit rate that the MZMs 881-884 can support, for example 100 Gbps. These four bit streams are used to drive the four MZMs 881-884, each of which configured to provide intensity modulation at the target bit rate in response to receiving the drive signal at the target bit rate. Optical AM signal 901 transmitted by the transmitter 970 may then carry for example 400 G PAM4 data signal over a single optical fiber in four wavelength channels.

Generally modifications of transmitter 970 may include NMZMs disposed to modulate N different wavelengths and followed by a 1 to N wavelength MUX to transmit N wavelength channels over a single optical fiber, where N is an integer equal or greater than 2.

Figure 15:
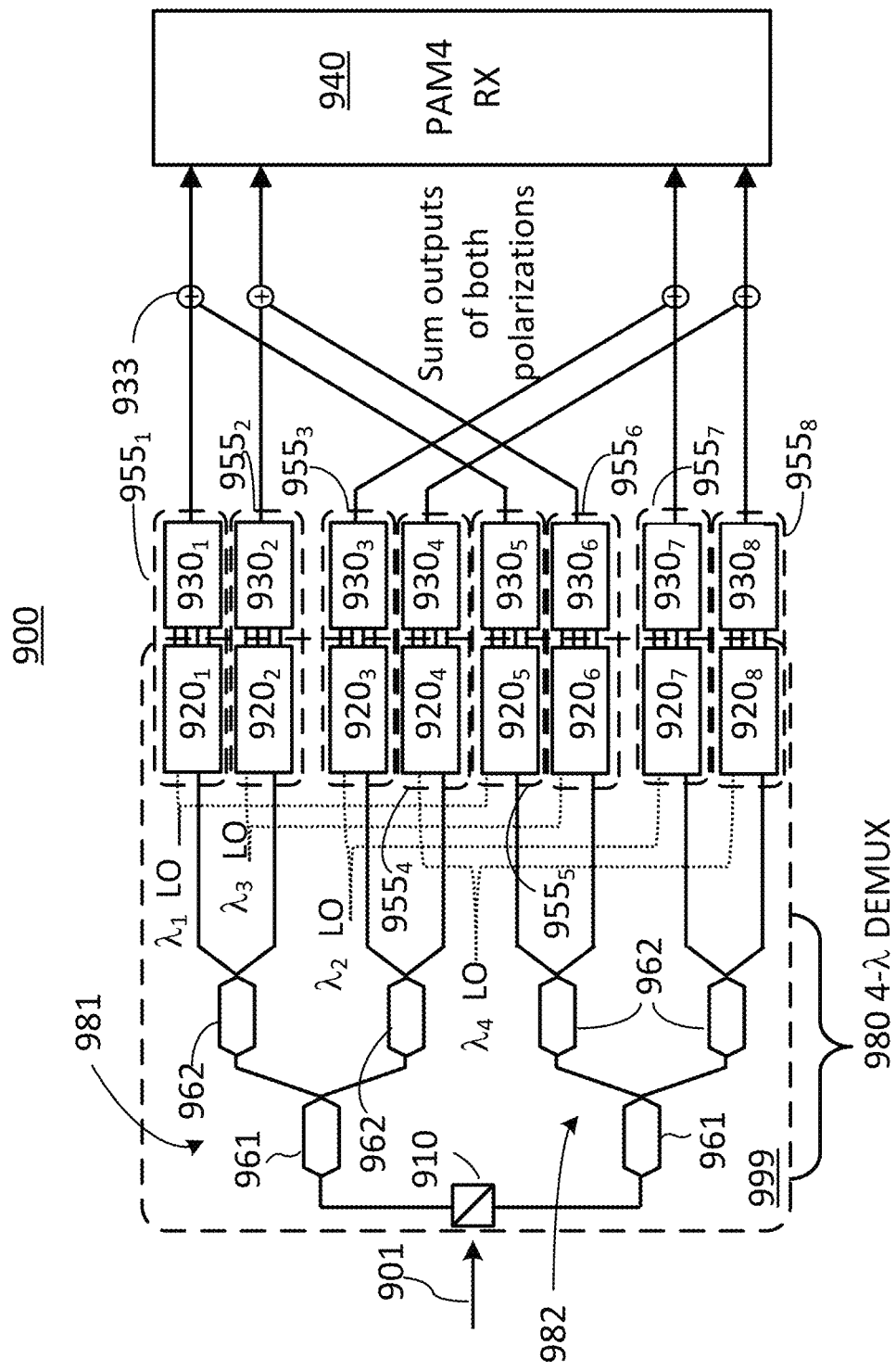
FIG. 15 is a schematic block diagram of a coherent optical receiver for receiving the wavelength-multiplexed AM signals generated with the optical transmitter of FIG. 14.

FIG. 15 illustrates an example COR 900 configured for receiving and demultiplexing an optical signal carrying N=4 AM wavelength channels absent of polarization multiplexing, such as the optical signal 901 that may be generated by transmitter 970. In the illustrated embodiment COR 900 is a coherent polarization diversity receiver that includes 2N PDAM detectors $955_i$, i=1, 2, ..., 2N to separately convert two orthogonal polarizations of each of the N wavelength channels to two electrical power signals that are responsive to the amplitude modulation of the respective wavelength generated at the transmitter, and then combine the electrical power signals stemming from the two polarizations of the same wavelength to obtain N=4 output electrical signals, each carrying the transmitter-generated AM signal of a corresponding wavelength channel. Each of the 2N PDAM detectors $955_i$, i=1, 2, ..., 2N, may be an embodiment of the PDAM detector 55 or the PDAM detector 155 described above, and may include an OH $920_i$ followed by an OE converter $930_i$. Each OE converter $930_i$ may be an embodiment of the OE converter 30 or 130 described above.

In the embodiment illustrated in FIG. 15, COR 900 has an optical front-end in the form of a PIC 999 that includes an input PBS 910, two wavelength deMUXs 981 and 982, and 2N=8 OHs $920_i$, i=1, ..., 8, which are composed of a first group of N=4 OH $920_1$, $920_2$, $920_3$, $920_4$ with signal ports optically connected to outputs of the first deMux 981, and a second group of N=4 PDAM detectors $920_5$, $920_6$, $920_7$, $920_8$ with signal ports optically connected to outputs of the first deMux 982. Each OH $920_i$ may be as described above with reference to OH 20 and 120, for example a 90° OH. In some embodiments four LO lasers emitting at the four wavelength $\lambda_1$, $\lambda_2$, $\lambda_3$, and $\lambda_4$ may be provided, with each LO laser coupled to the LO ports of two OHs $920_i$ with an optical splitter. In other embodiments a multi-wavelength laser source may be used to feed the LO ports of more than two OHs $920_i$ simultaneously.

Input PBS 910 may be an embodiment of PBS 110 described above. Output ports of PBS 910 connect to the input ports of the first deMUX 981 and the second deMUX 982, respectively. Each of the first and second deMUXs 981, 982 has N=4 output ports, and is configured to de-multiplex the N=4 wavelengths $\lambda_n$, n=1, . . . , N, received in the input port thereof and direct each to a different output port of the respective deMUX. LO sources of N=4 different wavelengths $\lambda_n$, which may be equal to the demultiplexed wavelengths $\lambda_i$ at the outputs of the wavelength deMUXs 981, 982, are coupled to the LO ports of corresponding OHs 920$_n$ and 920$_{n+N}$, n=1, . . . , 4, so that the LO and signal port of each OH 120$_i$ receives light of a same wavelength. By way of example, $\lambda_1$=1271 nm, $\lambda_2$=1291 nm, $\lambda_3$=1311 nm, and $\lambda_4$=1331 nm, with a single LO source of each wavelength feeding the LO ports of two OHs 120. In other embodiments COR 900 may be configured to receive a different set of multiplexed wavelengths, and use LO sources of matching wavelengths.

In operation PBS 910 splits received signal light 901 into an X-polarization signal and a Y-polarization signal, each of which may carry the N=4 wavelengths $\lambda_i$. The first deMUXs 981 splits light of the X-polarization into the N=4 wavelengths $\lambda_i$, each of which coupled into a different OH 920$i$ of the first group of OHs, with the OE converters 930$i$, i=1,2,3, or 4, coupled to the respective OH 920$i$ producing a first set of electrical power signals. The second deMUXs 982 splits light of the Y-polarization into the same N=4 wavelengths each of which coupled into a different OH 920$i$ of the second group of OHs, i=5,6,7, or 8. The OE converters 930$i$, i=5,6,7, or 8, coupled to the respective OH 920$i$ producing a second set of electrical power signals. Four electrical summing circuits 933 may be provided to pairwise combine the electrical power signals corresponding to a same wavelength by different polarizations. An electrical receiver circuit 940 may be used to perform desired signal processing on the N=4 resulting output electrical signals. In an example embodiment wherein the four wavelengths of the light signal 901 carry a 400 Gbps PAM4 signal, the electrical receiver circuit 940 may be configured to reconstruct the transmitter-defined 400 Gbps bit stream from the four electrical power signals from the four OE converters 930.

Example embodiments described above with reference to FIGS. 1-15 provide a coherent optical receiver (COR) comprising a photonic integrated circuit (PIC), a first optoelectronic (OE) converter, and a second OE converter. The PIC may comprise: a first polarization beam splitter (PBS) comprising a first output port and a second output ports, the PBS configured to split received signal light, which may carry one or more amplitude modulation (AM) signals, between the first and second output ports in a polarization-dependent manner; a first optical hybrid (OH) comprising an input signal port optically coupled to the first output port of the first PBS; and, a second OH comprising an input signal port optically coupled to the second output port of the first PBS, each of the first and second OH further comprising a local oscillator (LO) port and at least two output ports. The first OE converter is coupled to the at least two output optical ports of the first OH and is configured to produce a first electrical power signal responsive to amplitude modulation of light received in the input signal port of the first OH. The second OE converter is coupled to the at least two output optical ports of the second OH and is configured to produce a second electrical power signal responsive to amplitude modulation of light received in the input signal port of the second OH. Each of the first and second OE converters may comprise at least one differential detector and at least one squaring circuit for squaring electrical signals produced by the at least one differential detector. At least one of the differential detectors may comprise two photodetectors (PD) and a differential amplifier electrically coupled thereto.

In some implementations at least the first OH may comprise a 90° OH, with at least the first OE converter comprising first and second differential detectors, first and second squaring circuits connected to the first and second differential detectors, respectively, and a first summing circuit for summing output signals of the first and second squaring circuits. A second summing circuit for combining the first and second electrical power signals may also be provided.

In some implementations the coherent optical receiver may further comprise one or more LO sources optically coupled to the LO ports of the first and second optical hybrids. In some implementations the one or more LO sources may comprise one or more lasers integrated with the PIC.

In some implementations the PIC may further comprise a first dual polarization controller (PC) disposed to connect the first PBS to the input signal ports of the first and second optical hybrids. In some implementations the first dual PC may comprise an optical coupler network including a plurality of tunable optical phase shifters.

In some implementations the PIC may comprises at least one tunable dispersion compensator disposed in an optical path between the first PBS and at least one of the first and second optical hybrids. In some implementations the at least one tunable dispersion compensator may comprise two or more waveguides configured to form two or more length-unbalanced Mach-Zehnder interferometers with a tunable coupling therebetween.

In some implementations the coherent optical receiver may comprise a first tunable dispersion compensators disposed in an optical path from the first output port of the first PBS and the first OH, and a second tunable dispersion compensators disposed in an optical path from the second output port of the first PBS and the second OH.

In some implementations the coherent optical receiver may comprise an electronic receiver circuit configured to process the first and second electrical power signals, or one or more signals related thereto.

In accordance with an aspect of the present disclosure, the coherent optical receiver may be configured for receiving a PAM4 signal comprising the first light signal transmitted over a first optical fiber and a second light signal transmitted over a second optical fiber, wherein each of the first and second light signals comprises two AM signals combined by polarization multiplexing. The PIC of the coherent optical receiver may comprise: a second PBS comprising an input port for receiving the second light signal and two output ports; a third OH comprising an input signal port, a local oscillator (LO) port, and at least two output ports; a fourth OH comprising an input signal port, a local oscillator (LO) port, and at least two output ports; and, a second dual PC optically coupling two output ports of the second PBS to the input signal ports of the third and fourth OHs. The coherent optical receiver may further comprise: a third OE converter coupled to the output ports of the third OH and configured to produce a third electrical power signal responsive to amplitude modulation of light received in the input signal port of the third OH; and, a fourth OE converter coupled to the output ports of the fourth OH and configured to produce a fourth electrical power signal responsive to amplitude modulation of light received in the input signal port of the fourth OH. The coherent optical receiver may further comprise an optical LO source coupled to the LO ports of each of the first OH, second OH, third OH, and fourth OH.

In accordance with an aspect of the present disclosure, the received signal light may comprise a PAM4 signal carried by a first wavelength comprising two polarization channels and a second wavelength comprising two polarization channels. The PIC of the coherent optical receiver may comprise: a third OH comprising an input signal port, an LO port, and two or more output ports; a fourth OH comprising an input signal port, an LO port, and two or more output ports; a first demultiplexer configured to split light received from the first output port of the first PBS into the first and second wavelengths; a second demultiplexer configured to split light received from the first output port of the first PBS into the first and second wavelengths; a first dual PC configured to receive the first wavelengths from each of the first and second wavelength demultiplexer and to provide a first polarization channel of the first wavelength to the input signal port of the first OH and a second polarization channel of the first wavelength to the second OH; a second dual PC configured to receive the second wavelengths from each of the first and second wavelength demultiplexer and to provide a first polarization channel of the second wavelength to the input signal port of the third OH and a second polarization channel of the second wavelength to the fourth OH. The coherent optical receiver may further comprise: a third OE converter coupled to the output ports of the third OH and configured to produce a third electrical power signal responsive to amplitude modulation of light received in the input signal port of the third OH; and, a fourth OE converter coupled to the output ports of the fourth OH and configured to produce a fourth electrical power signal responsive to amplitude modulation of light received in the input signal port of the fourth OH. In some implementations the coherent optical receiver may further comprise an LO source of the first wavelength coupled to the LO ports of the first and second OHs and an LO source of the second wavelength coupled to the LO ports of the third and fourth OHs.

In some implementations the coherent optical receiver may comprise an electronic receiver circuit configured to process the PAM4 signal based on the first, second, third, and fourth electrical power signals.

An aspect of the present disclosure provides a coherent optical receiver wherein the received signal light comprises a plurality of N wavelengths, N≥2, each of the N wavelengths carrying an AM signal, and wherein the PIC comprises a plurality of 2N OHs, the plurality of 2N OHs comprising: a first OH group comprising N OHs including the first OH, wherein each OH from the first OH group comprises a signal port, an LO port, and at least two output ports; and, a second OH group comprising N OHs including the second OH, wherein each OH from the first OH group comprises a signal port, an LO port, and at least two output ports. The PIC of the coherent optical receiver may further comprise a first demultiplexer and a second demultiplexer. The first demultiplexer may comprise an input port coupled to the first output port of the first PBS, and N output ports separately coupled to the signal ports of the N OHs of the first OH group. The second demultiplexer may comprise an input port coupled to the second output port of the first PBS, and N output ports separately coupled to the signal ports of the N OHs of the second OH group. Each of the first and second demultiplexers may be configured to demultiplex the N wavelength from light received from the input port thereof and to separately output N demultiplexed wavelengths from the N output ports thereof. The coherent optical receiver may further comprise: 2N OE converters including the first OE converter and the second OE converter, wherein each of the 2N OE converters coupled to the output ports of a different OH from the plurality of 2N OHs and configured to output an electrical power signal responsive to one of the AM signals; and, N summing circuits configured to pair-wise combine the electrical power signals corresponding to a same wavelength.

In some implementations the coherent optical receiver may be configured to receive PAM4 signals carried by the plurality of N=4 wavelengths.

In some implementations the coherent optical receiver may comprising a silicon photonic chip implementing the PIC.

Advantageously, the embodiments of the COR described above do not require complicated and power-hungry digital single processing to demultiplex and demodulate the TX-defined subchannels from the received optical signals, as they take advantage of coherent reception without requiring complicated optical phase recovery processing. As a further advantage, optical front ends of each of the example COR described above may be implemented as a PIC using planar optical waveguides defined in a single chip formed with suitable semiconducting or dielectric materials. Non-limiting examples of such materials and material systems include silicon (Si) or silica, gallium arsenide (GaAs), indium phosphide (InP), or corresponding compounds. In some embodiments the same chip may also include the PDs of the OE converters. In some embodiments the chip may be formed of a semiconductor wafer, for example but not exclusively a SOI wafer, and may also include electrical circuitry of the OE converters described above, such as for example one or more of the TIAs, the squaring circuits, and the summing circuits.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings.

For example, it will be appreciated that different dielectric materials and semiconductor materials other than silicon, including but not limited to compound semiconductor materials of groups commonly referred to as A3B5 and A2B4, such as GaAs, InP, and their alloys and compounds, may be used to fabricate the optical circuits example embodiments of which are described hereinabove. Further by way of example, embodiments of the COR described above may utilize 180° optical hybrids having two output ports instead of 90° optical hybrids. In such embodiments the PDAM detectors 55, 155, 855, 955 may include one differential detector followed by a squaring circuit. Furthermore, in some embodiments.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A coherent optical receiver (COR), comprising:
a photonic integrated circuit (PIC) comprising:
a first polarization beam splitter (PBS) comprising a first output port and a second output port and configured to split received signal light between the first and second output ports in a polarization-dependent manner, the received signal light carrying one or more amplitude modulation (AM) signals;
a first optical hybrid comprising an input signal port optically coupled to the first output port of the first PBS, a local oscillator (LO) port, and at least two output ports; and,
a second optical hybrid comprising an input signal port optically coupled to the second output port of the first PBS, an LO port, and at least two output ports;
a first opto-electronic (OE) converter coupled to the at least two output ports of the first optical hybrid and configured to produce a first electrical power signal responsive to amplitude modulation of light received in the input signal port of the first optical hybrid; and
a second OE converter coupled to the at least two output ports of the second optical hybrid and configured to produce a second electrical power signal responsive to amplitude modulation of light received in the input signal port of the second optical hybrid;
wherein each of the first and second OE converters comprises at least one differential detector and at least one squaring circuit for squaring electrical signals produced by the at least one differential detector;
wherein the PIC further comprises a first dual polarization controller (PC) disposed to connect the first PBS to the input signal ports of the first and second optical hybrids.

2. The coherent optical receiver of claim 1 wherein at least one of the differential detectors comprises two photodetectors (PD) and a differential amplifier electrically coupled thereto.

3. The coherent optical receiver of claim 1 wherein at least the first optical hybrid comprises a 90° optical hybrid, and wherein at least the first OE converter comprises first and second differential detectors, first and second squaring circuits connected to the first and second differential detectors, respectively, and a first summing circuit for summing output signals of the first and second squaring circuits.

4. The coherent optical receiver of claim 1 further comprising one or more LO sources optically coupled to the LO ports of the first and second optical hybrids.

5. The coherent optical receiver of claim 4 wherein the one or more LO sources comprise one or more lasers integrated with the PIC.

6. The coherent optical receiver of claim 1 wherein the first dual PC comprises an optical coupler network including a plurality of tunable optical phase shifters.

7. The coherent optical receiver of claim 1 further comprising a first tunable dispersion compensator disposed in an optical path from the first output port of the first PBS and the first optical hybrid, and a second tunable dispersion compensators disposed in an optical path from the second output port of the first PBS and the second optical hybrid.

8. The coherent optical receiver of claim 1 further comprising an electronic receiver circuit configured to process the first and second electrical power signals, or one or more signals related thereto.

9. The coherent optical receiver of claim 1 comprising a silicon photonic chip implementing the PIC.

10. A coherent optical receiver (COR), comprising:
a photonic integrated circuit (PIC) comprising:
a first polarization beam splitter (PBS) comprising a first output port and a second output port and configured to split received signal light between the first and second output ports in a polarization-dependent manner, the received signal light carrying one or more amplitude modulation (AM) signals;
a first optical hybrid comprising an input signal port optically coupled to the first output port of the first PBS, a local oscillator (LO) port, and at least two output ports; and,
a second optical hybrid comprising an input signal port optically coupled to the second output port of the first PBS, an LO port, and at least two output ports;
a first opto-electronic (OE) converter coupled to the at least two output ports of the first optical hybrid and configured to produce a first electrical power signal responsive to amplitude modulation of light received in the input signal port of the first optical hybrid; and,
a second OE converter coupled to the at least two output ports of the second optical hybrid and configured to produce a second electrical power signal responsive to amplitude modulation of light received in the input signal port of the second optical hybrid;
wherein each of the first and second OE converters comprises at least one differential detector and at least one squaring circuit for squaring electrical signals produced by the at least one differential detector;
wherein the PIC further comprises at least one tunable dispersion compensator disposed in an optical path between the first PBS and at least one of the first and second optical hybrids.

11. The coherent optical receiver of claim 10 wherein the at least one tunable dispersion compensator comprises two or more waveguides configured to form two or more length-unbalanced Mach-Zehnder interferometers with a tunable coupling therebetween.

12. A coherent optical receiver (COR) for receiving signal light comprising a PAM4 signal carried by a first wavelength comprising two polarization channels and a second wavelength comprising two polarization channels, the coherent optical receiver comprising:
a photonic integrated circuit (PIC) comprising:
a first polarization beam splitter (PBS) comprising a first output port and a second output port and configured to split the received signal light between the first and second output ports in a polarization-dependent manner, the received signal light carrying one or more amplitude modulation (AM) signals;
a first optical hybrid comprising an input signal port optically coupled to the first output port of the first PBS, a local oscillator (LO) port, and at least two output ports; and,
a second optical hybrid comprising an input signal port optically coupled to the second output port of the first PBS, an LO port, and at least two output ports;
a first opto-electronic (OE) converter coupled to the at least two output ports of the first optical hybrid and configured to produce a first electrical power signal responsive to amplitude modulation of light received in the input signal port of the first optical hybrid; and,
a second OE converter coupled to the at least two output ports of the second optical hybrid and configured to produce a second electrical power signal responsive to amplitude modulation of light received in the input signal port of the second optical hybrid;

wherein each of the first and second OE converters comprises at least one differential detector and at least one squaring circuit for squaring electrical signals produced by the at least one differential detector;

wherein the PIC further comprises:
  a third optical hybrid comprising an input signal port, an LO port, and two or more output ports;
  a fourth optical hybrid comprising an input signal port, an LO port, and two or more output ports;
  a first demultiplexer configured to split light received from the first output port of the first PBS into the first and second wavelengths;
  a second demultiplexer configured to split light received from the first output port of the first PBS into the first and second wavelengths;
  a first dual PC configured to receive the first wavelengths from each of the first and second demultiplexer and to provide a first polarization channel of the first wavelength to the input signal port of the first optical hybrid and a second polarization channel of the first wavelength to the second optical hybrid;
  a second dual PC configured to receive the second wavelengths from each of the first and second demultiplexer and to provide a first polarization channel of the second wavelength to the input signal port of the third optical hybrid and a second polarization channel of the second wavelength to the fourth optical hybrid;

the coherent optical receiver further comprising:
  a third OE converter coupled to the output ports of the third optical hybrid and configured to produce a third electrical power signal responsive to amplitude modulation of light received in the input signal port of the third optical hybrid; and,
  a fourth OE converter coupled to the output ports of the fourth optical hybrid and configured to produce a fourth electrical power signal responsive to amplitude modulation of light received in the input signal port of the fourth optical hybrid.

13. The coherent optical receiver of claim 12 further comprising an LO source of the first wavelength coupled to the LO ports of the first and second optical hybrids and an LO source of the second wavelength coupled to the LO ports of the third and fourth optical hybrids.

14. The coherent optical receiver of claim 13 further comprising an electronic receiver circuit configured to process the PAM4 signal based on the first, second, third, and fourth electrical power signals.

* * * * *